(12) United States Patent
Flegel et al.

(10) Patent No.: US 7,888,821 B2
(45) Date of Patent: Feb. 15, 2011

(54) APPARATUS AND METHOD FOR POWERING LOAD CENTER CIRCUITS WITH AN AUXILIARY POWER SOURCE

(75) Inventors: Michael O. Flegel, Racine, WI (US); Jeffrey D. Flegel, Racine, WI (US); Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 18 days.

(21) Appl. No.: 12/435,849

(22) Filed: May 5, 2009

(65) Prior Publication Data

US 2009/0212630 A1 Aug. 27, 2009

Related U.S. Application Data

(63) Continuation-in-part of application No. 12/133,942, filed on Jun. 5, 2008, now Pat. No. 7,834,486, which is a continuation-in-part of application No. 11/801,171, filed on May 9, 2007, now Pat. No. 7,602,083.

(51) Int. Cl.
*H01H 47/00* (2006.01)
(52) U.S. Cl. .................................. 307/126; 307/64
(58) Field of Classification Search .................. 307/64, 307/126, 326; 200/50.32
See application file for complete search history.

(56) References Cited

U.S. PATENT DOCUMENTS

| 7,418,314 B2* | 8/2008 | Rasmussen et al. .......... 700/286 |
| 2003/0075982 A1* | 4/2003 | Seefeldt ....................... 307/29 |

* cited by examiner

*Primary Examiner*—Jared J Fureman
*Assistant Examiner*—Carlos Amaya
(74) *Attorney, Agent, or Firm*—Boyle Fredrickson, S.C.

(57) ABSTRACT

An electrical distribution system is designed to automatically connect a dedicated group of circuits, which are normally powered by a primary power source, to an auxiliary power source upon detection that there has been a disruption or failure in the primary power source. The system includes a switching arrangement that allows an operator to manually connect the auxiliary power source with other circuits that are not generally powered during disruption of the primary power source. The switching arrangement includes an interlinked switch or breaker arrangement that prevents any of the other circuits that are normally powered by the primary source from being automatically connected to the primary power source when primary power source is restored if those other circuits are connected to the auxiliary power source when the primary power source is restored.

21 Claims, 6 Drawing Sheets

APPARATUS AND METHOD FOR POWERING LOAD CENTER CIRCUITS WITH AN AUXILIARY POWER SOURCE

CROSS-REFERENCE TO RELATED APPLICATION

The present application is a continuation-in-part of U.S. Ser. No. 12/133,942, filed Jun. 5, 2008, now U.S. Pat. No. 7,834,486 which is a continuation-in-part of U.S. Ser. No. 11/801,171, filed May 9, 2007 now U.S. Pat. No. 7,602,083, the disclosures of which are incorporated herein by reference.

BACKGROUND OF THE INVENTION

This invention relates generally to coordinating power delivery to critical and non-critical loads of a building or similar structure during main or primary power failure. More particularly, the present invention is directed to a transfer switch that allows circuits of a load center to be connected to an auxiliary power source when primary power fails.

A building, such as a home or other dwelling, will present critical and non-critical loads to the primary power source to the building, which is generally a utility power supply. The critical loads for a home, for instance, may include the HVAC system, sump pump, refrigerators, freezers, dishwasher, washer/dryer, and life-sustaining medical equipment. All other loads of the home will generally be considered non-critical. The non-critical loads are generally connected to non-critical branches that are hardwired to a load center and the critical loads may be connected to critical branches that are hardwired to a separate subpanel; both of which are powered by the primary power source during normal primary power source operation.

To ensure power to the critical loads during primary power source failure, it is known to connect the subpanel and, thus, the critical loads, to an auxiliary power source, such as electrical generator. This connection of the subpanel to the auxiliary power source may be done automatically by an automatic auxiliary power supply system that detects primary power source failure and automatically starts an auxiliary power source, such as an electrical generator, when primary power source failure is detected. The automatic auxiliary power supply system also includes an automatic transfer switch that switches over connection of the subpanel to the auxiliary power source generator. In this regard, the subpanel is connected to the primary power source and the auxiliary power source through a transfer panel that contains the automatic transfer switch. In some installations, the automatic transfer switch and the subpanel are both contained within the transfer panel.

Conventional transfer switches connect only the circuits hardwired to the subpanel to the auxiliary power source. In this regard, during operation of the auxiliary power supply system, it is not possible for an operator, such as a homeowner, to power a non-critical load with the auxiliary power source in the event the homeowner happens to be home when the primary power source fails. For instance, with conventional automatic transfer switches, a homeowner cannot temporarily connect a non-critical load, such as a television or radio, to the auxiliary generator when the primary power source fails.

One proposed automatic transfer switch is disclosed by Hinks, U.S. Pat. No. 6,563,233, which allows an operator to manage, or utilize auxiliary power for energizing a load center circuit through manipulation of a manual feedback breaker and a main branch breaker. More particularly, Hinks describes a system whereby a normally closed manual feeder breaker connects the primary power source to the subpanel during normal primary power source operation. When the primary power source fails, the automatic transfer switch activates the auxiliary power source. In order to connect the load center to the auxiliary power source, the operator may manually close a normally open manual feedback breaker, which supplies power to all circuits of the load center. However, in the system described by Hinks, it is possible for the normally closed manual feeder breaker and the normally open manual feedback breaker to both be closed at the same time, which can result in the entire load center being automatically connected to the auxiliary power source when the auxiliary power source is subsequently brought online, which not only is in violation of the U.S. National Electrical Code but also likely results in a load that exceeds the capacity of the generator. That is, the system described by Hinks allows those circuits of the load center having closed main branch breakers to be automatically connected to the auxiliary power source when the normally open manual feedback breaker is closed. To avoid circuits of the load center from being connected to the auxiliary power source upon closing of the manual feedback breaker, the operator must individually open each of the conventional main branch breakers for those load center circuits. Additionally, Hinks describes the need for a "second" main breaker to avoid backfeeding of the primary power source when the auxiliary power source is supplying power to the load center.

Additionally, conventional power distribution systems are set up such that the load center and the subpanel are maintained in separate cabinets with separate buses.

BRIEF DESCRIPTION OF THE INVENTION

The present invention is directed to a combination of automatic and manual transfer switches either on separate buses in separate cabinets or on separate buses in the same cabinet. The automatic transfer switch allows the connection of critical circuits during a power outage. The critical circuits are selected such that the generator is not overloaded, as required by the National Electrical Code. The manual transfer switch allows for the connection of additional circuits to auxiliary power, which is allowed by the National Electrical Code. To safely accomplish combined use of an automatic transfer switch and a manual transfer switch, the present invention utilizes a series of interlocks and switches or circuit breakers that function to maintain manual and automatic separation of primary power and auxiliary power. In addition, the present invention prevents auxiliary power from being interpreted as primary power by the automatic system.

The present invention is also applicable with distribution arrangements in which separate circuit breakers or switches are used for signaling whether primary power has been interrupted and for controlling the flow of electrical power to an electrical bus. For such an arrangement, the main panel may include a feeder breaker that controls the presentment of electrical power to a subpanel. A primary power feedback breaker or other device provides feedback to control circuitry in either the automatic transfer switch or the auxiliary power supply, e.g., generator, signaling when primary power has been interrupted. For such a construction, the present invention provides an interlock arrangement that locks out the primary power feedback switch from signaling the return of primary power if any of the circuits of the main electrical panel are being fed power from the auxiliary power supply.

It is therefore an object of the present invention to provide a power distribution system in which circuits of a main or first electrical panel may be fed power from an auxiliary or backup power supply during the interruption of primary power.

It is a further object of the invention to prevent control circuitry in an automatic transfer switch or auxiliary power supply from sensing the return of primary power when auxiliary power is available to the main panel.

Various features and advantages of the present invention will be made apparent from the following detailed description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

The invention is directed to a circuit and switch assembly that can be used in combination with an automatic transfer switch and generator package, in either a new installation or in a retrofit manner. The circuit and switch assembly is designed to allow any circuit, not just emergency or critical circuits, to be powered by an auxiliary power source, such as a generator, during primary power source failure. Insofar as the present invention relates to the automatic connection of critical or emergency loads to an auxiliary or auxiliary power source in the event of primary power source failure or disruption, such functionality is well-known in the art. For example, U.S. Pat. No. 7,119,457, the disclosure of which is incorporate herein by reference, describes a transfer switch that connects loads in order of priority to auxiliary power. It is understood that the present invention is applicable with such transfer switches and other transfer switches that provide automatic connection of circuits to an auxiliary power source.

Figure 1:
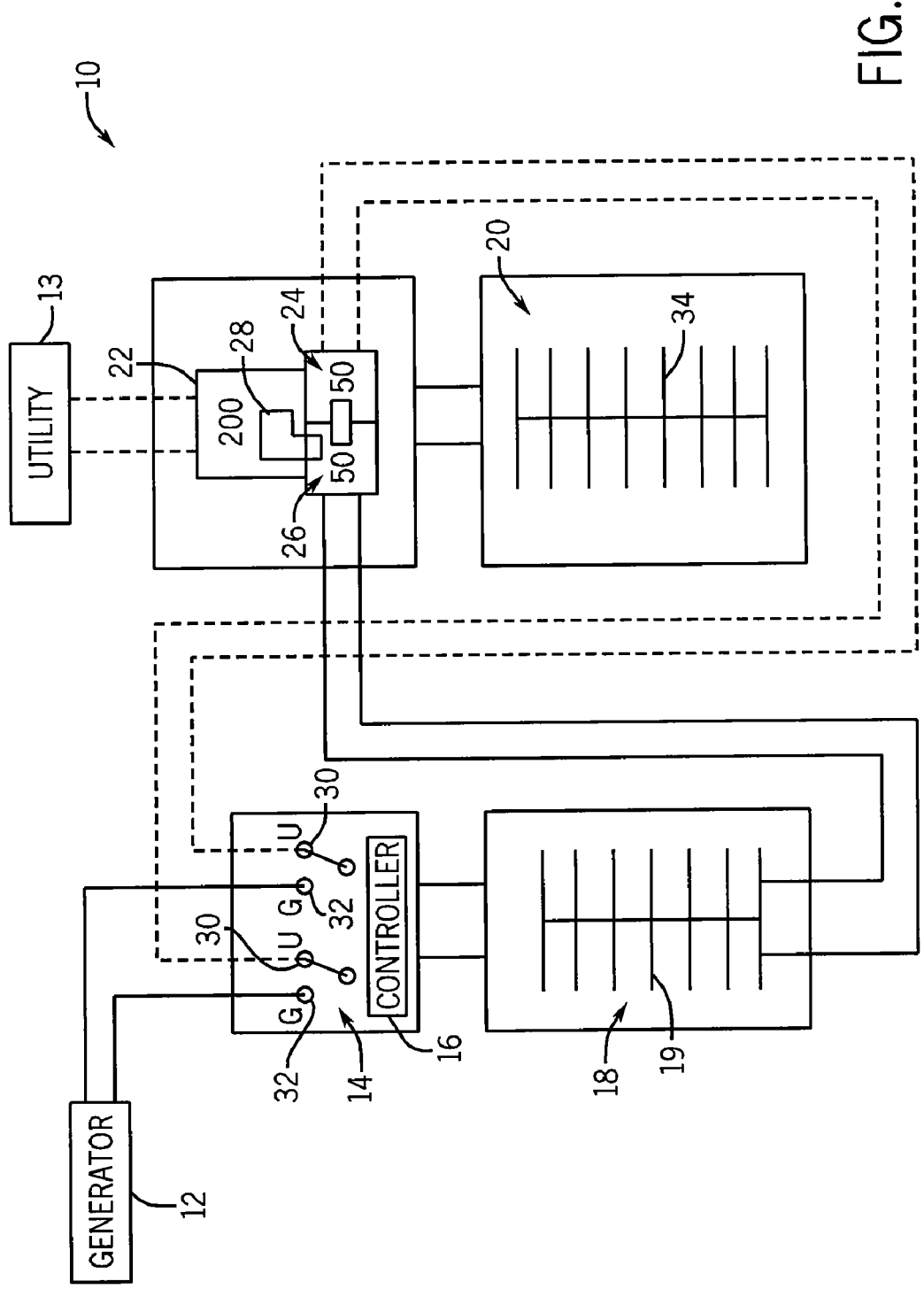
FIG. 1 is a wiring diagram of an automatic transfer switch and auxiliary power system for maintaining power to critical or emergency circuits while permitting the supply of power to selected non-emergency circuits from an auxiliary power source according to one embodiment of the present invention.

FIG. 1 shows a wiring diagram of an automatic transfer switch assembly and auxiliary power source system 10, in accordance with one aspect of the present invention. System 10 includes an auxiliary power source 12 that provides power to a transfer switch 14 in a known manner. The transfer switch 14 is controlled by a controller 16 that automatically switches the transfer switch 14 so that a subpanel 18, and its circuits 19, connects to the auxiliary power source if a loss of primary power is detected. In this regard, the system 10 may include various voltage and current sensors (not shown) as known in the art to detect a disruption or loss in main power.

As noted above, in a customary installation, the subpanel 18 contains those circuits that are connected to critical or emergency loads, such as the HVAC system, appliances, water pumps, emergency lighting, and the like. All other loads of the building are connected to the primary power source, shown at 13, through a load center or main panel 20. In conventional transfer switch and generator packages, the circuits of the load center, which are typically non-critical or non-emergency circuits, can only be energized by the primary power source. In accordance with the present invention, however, and as will be described below, the present invention contemplates the connection of selected non-critical or non-emergency circuits of the load center to the auxiliary power source 12 when power from the primary power source 13 is interrupted.

In accordance with conventional systems, power to the load center 20 is controlled by a main switch or breaker 22. In one embodiment, the main breaker 22 is a 200 A breaker. As is known, when the main breaker 22 is in the ON position, power from the primary power source 13 is available to all of the branch circuits, including a branch circuit 34 for example, of the load center 20 provided the individual breakers (not shown) for the branch circuits are also in the ON position.

As discussed above, a limitation of conventional transfer switch systems is that circuits of the load center 20, such as branch circuit 34, cannot be powered by the auxiliary power source 12 when there is a disruption in or loss of power from the primary power source 13. The present invention overcomes this limitation with implementation of an auxiliary system switch or circuit breaker 24 and an auxiliary system feeder switch or breaker 26. As will be described below, switches or breakers 24, 26 as well as main switch or breaker 22 are interlinked or interlocked by an interlock assembly 28. An exemplary interlock assembly is described in U.S. Pat. No. 6,621,689, the disclosure of which is incorporated herein by reference. The interlock assembly 28 prevents the interlinked breakers 24, 26 from being in ON positions simultaneously. The applicability of such a feature to the present invention will be described in greater detail below. It is noted that in one embodiment, breakers 24, 26 are both 50 A breakers; however, it is understood that the breakers 24, 26 may have any desired capacity.

Circuit breaker 24 controls the delivery of primary power to the transfer switch 14. Specifically, when the primary power source 13 is operational, breaker 24 feeds the primary power to the transfer switch 14 that then feeds the primary power to the subpanel 18. In this regard, the circuits of the subpanel 18 are energized in parallel with the circuits of the load center 20 during normal operation of the primary power source 13.

Circuit breaker 26 is designed to control power delivery from the auxiliary power source 12 to the load center 20 when there is a disruption or failure in primary power source 13. As such, the present invention, in contrast to conventional transfer switch and auxiliary power systems, energizes the load center 20, or selected circuits thereof, when the primary power source 13 is not delivering power. Because the breakers 24, 26 are interlinked, breaker 26 cannot be in the ON position when breaker 24 is in the ON position. That is, when breaker 26 is switched to the ON position, breaker 24 must necessarily be in the OFF position. This configuration prevents the controller 16 of the transfer switch 14 from mistakenly sensing auxiliary power as restoration of the primary power source 13. In a similar manner, breaker 24 cannot be in the ON position when breaker 26 is in the ON position, which ensures that power cannot be supplied to the load center 20 from both the primary power source 12 and the auxiliary power source 13.

Operation of the transfer switch and auxiliary power system in which auxiliary power is provided by a generator in accordance with one embodiment of the present invention will now be described with further reference to FIG. 1. When the primary power source 13 is operational, power is supplied through the main breaker 22 to all the circuits of the load center 20. Circuit breaker 24 feeds primary power from the primary power source 13 to the utility input(s) 30 on the transfer switch 14, which powers all the circuits in the subpanel 18. When primary power source 13 fails or is otherwise unavailable, the controller 16 of the transfer switch 14 detects a loss of primary power, automatically starts the generator 12, and automatically switches the subpanel 18 over to auxiliary power at generator input(s) 32. As such, the generator 12 powers all the circuits of the emergency subpanel 18. At this moment, none of the circuits of the load center 20 are powered as the primary power source 13 is not operative. However, the present invention allows an operator, such as a homeowner, to manually select one or more circuits of load center 20, such as load center circuit 34, to be powered by the generator 12 despite the loss of primary power.

Specifically, the operator may switch the main breaker 22 into the OFF position, which isolates the load center 20 from the primary power source 13. The operator then manually switches all of the distributed breakers in the load center 20 into the OFF position. Alternatively, the distributed breakers of load center 20 may be constructed such that each breaker is automatically switched to the OFF position when the main breaker 22 is switched OFF, and must be reset into the ON position to connect a respective circuit to the primary power source 13 when the main breaker 22 is switched into the ON position. Thus, when the main breaker is manually switched into the OFF position, the distributed breakers are either manually or automatically in an OFF state.

When the main breaker 22 is placed into the OFF position, the operator may then manually switch the interlinked input breaker 26 into the ON position. In order to do so, however, interlock assembly 28 must first be positioned so as to enable movement of input breaker 26 to the ON position, which can only occur when main breaker 22 is in the OFF position. This ensures that load center 20 and subpanel 18 are isolated from primary power source 13. Breaker 24 and input breaker 26 are interlinked, such that movement of input breaker 26 to the ON position necessarily places breaker 24 into the OFF position. At this point, input breaker 26 is in a conductive state and in series with the subpanel 18. As a result, auxiliary power from generator 12 is available to the load center 20, provided the load capacity of the generator 12 has not been reached by the active circuits of the subpanel 18. Moreover, because breaker 24 and main breaker 22 are in the OFF position, the automatic transfer switch 14 does not see the power delivered to the load center 20 by generator 12 at utility power inputs 30, which ensures that the automatic transfer switch 14 does not mistake auxiliary power delivered to the load center 20 as restored primary power.

In the event the operator wishes to utilize one of the non-critical circuits of load center 20, e.g. circuit 34 (with which a non-critical load such as a television, radio, non-critical room lights, etc. may be interconnected), the operator manually closes circuit 34 of the load center through a reset of the distribution breaker for that circuit 34, i.e. by positioning the breaker for circuit 34 in the ON position. Since input breaker 26 is positioned so as to deliver power from generator 12 to load center 20, the generator 12 will provide auxiliary power to the closed circuit 34 to supply power to the non-critical load. If the operator makes such a connection, the generator 12 supplies power to the subpanel 18 even when primary power is restored, as described below. Moreover, since the main breaker 22 is in the OFF state, auxiliary power is not backfed to the primary power source 13.

In the event primary power is restored and the operator has not connected load center 20 to the auxiliary power source, i.e., the main breaker 22 remains in the ON position and breaker 26 remains in the OFF position, the transfer switch 14 automatically switches back to its utility inputs 30 and the circuits in the subpanel 18 return to be powered by the primary power source 13 through main breaker 22, auxiliary system breaker 24, and the transfer switch 14. On the other hand, if a load center circuit, such as circuit 34, is connected to the transfer switch 14 when primary power is restored with main breaker 22 in the OFF position and auxiliary system feeder breaker 26 in the ON position, the return of primary power will have no impact on the system.

Specifically, in order to power the system from primary power source 13 when utility power is restored, the operator must manually switch input breaker 26 into the OFF position and manually switch main breaker 22 into the ON position, and return all the distribution breakers in the load center 20 to the ON position. As such, the load center 20 is only reenergized by the primary power source 13 if the operator manually switches breaker 26 into the OFF position and the main breaker 22 is switched to the ON position. While breakers 24, 26 are interlinked, switching breaker 26 into the OFF position does not necessarily move auxiliary system breaker 24 into the ON position, and the operator must manually move auxiliary system breaker 24 to the ON position after breaker 26 has been placed into the OFF position. After breaker 26 has been placed into the OFF position and breakers 22 and 24 have been returned to the ON position, the controller 16 of the automatic transfer switch detects the return of primary power, and reconnects the subpanel 18 to the primary power source 13. This results in the load center 20 and the subpanel 18 being powered by the primary power source 13 and auxiliary power source 12 is automatically powered down or switched OFF.

Figure 2:
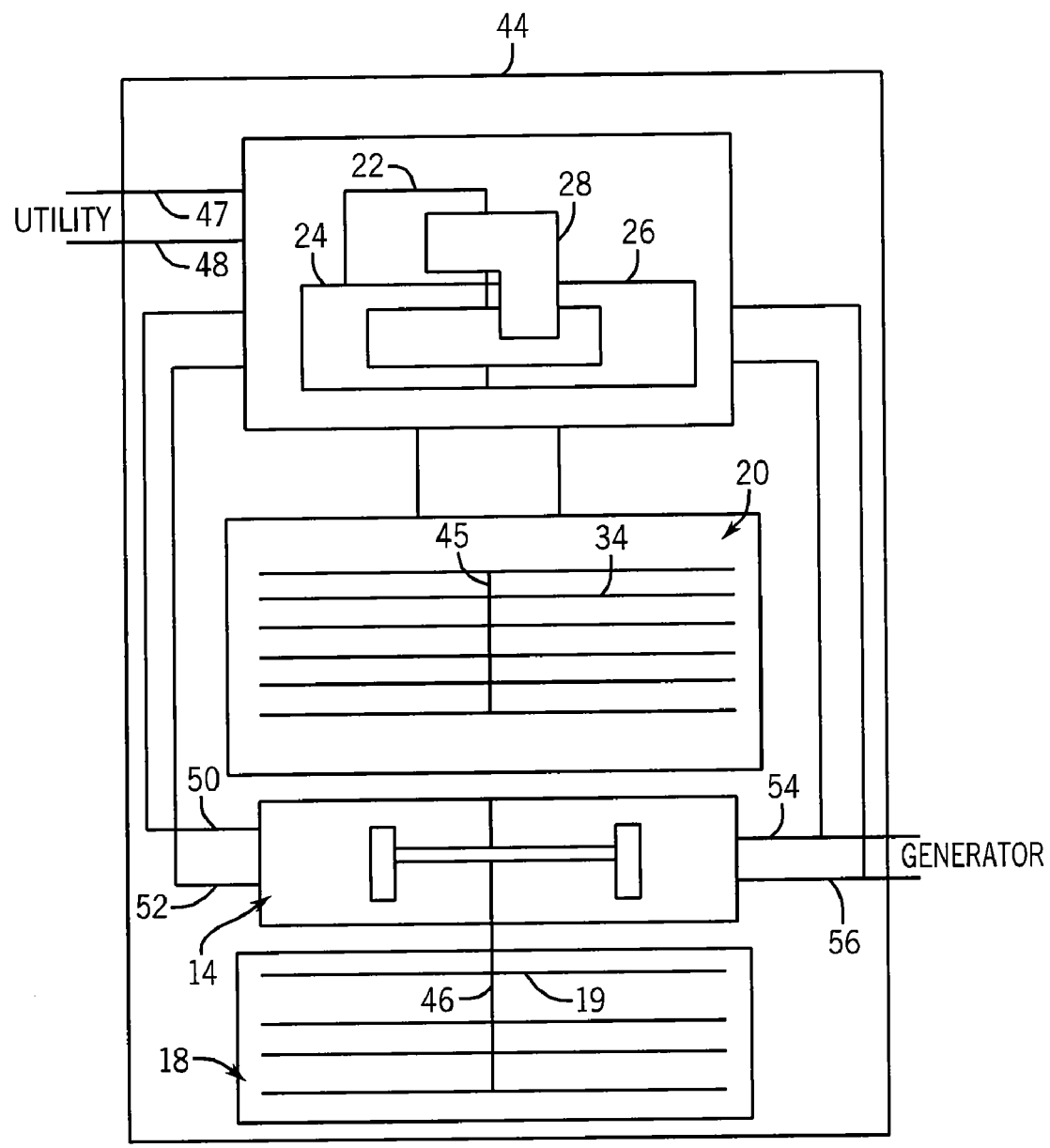
FIG. 2 is a schematic representation of a cabinet containing a manual transfer switch and an automatic transfer switch that is electrically isolated from the manual transfer switch when auxiliary power is used to energize loads of the manual transfer switch.

It is contemplated that the subpanel 18 and the load center 20 may be contained in separate cabinets or in a single cabinet 44, such as illustrated in FIG. 2. Similarly, the primary power input breaker 22, auxiliary system circuit breaker 24, and auxiliary system feeder breaker 26 are contained within the single cabinet 44 as is transfer switch 14 and controller 16 (not shown). Thus, during normal operation of the utility power source 13, the utility power source 13 energizes inputs 47, 48 of the primary power input breaker 22. The auxiliary system circuit breaker 24 is associated with the primary power input breaker 22 and effectively provides utility power to the inputs 50, 52 of the transfer switch 14 when manually switched to a conductive state. When contained within the single cabinet 44, circuits 34 are connected to a first electrical bus 45 whereas the circuits 19 of the subpanel 18 are connected to a second electrical bus 46.

When utility power is interrupted, the controller 16 automatically functions to electrically isolate the transfer switch 14, and thus subpanel 18, from the utility power source 13. The controller 16 also causes the auxiliary power source to begin energizing the auxiliary inputs 54, 56 of the transfer switch 14. As a result, auxiliary power is available for the circuits of the subpanel 18.

Similar to that described with respect to FIG. 1, the load center 20 may also be energized by the auxiliary power source 12. More particularly, the feeder breaker 26 may be manually switched to a conductive position. However, because of interlock member 28, the feeder breaker 26 can only be switched after the breakers 22, 24 are each manually switched to a non-conductive position. In this regard, the circuit breakers 34 of the load center 20 may be energized by auxiliary power through breaker 26 only after the primary power input breaker 22 and the auxiliary system breaker 24 have been electrically isolated from the utility 13. This configuration prevents auxiliary power from being provided at the utility power inputs 50, 52 of the automatic transfer switch 14 and thereby causing the controller 16 to mistakenly detect the return of utility power.

In order for the automatic transfer switch 14 to sense the restoration of primary power, the feeder breaker 26 must be switched to its non-conductive position and the primary power input breaker 22 and auxiliary system breaker 24 must be returned to their conductive positions. Because of the interlock member 28, the primary power input breaker 22 and the auxiliary system breaker 24 can only be switched to their respective conductive positions only after the feeder breaker 26 has been manually switched to its non-conductive position, as particularly shown in FIGS. 3 and 4.

Figure 3:
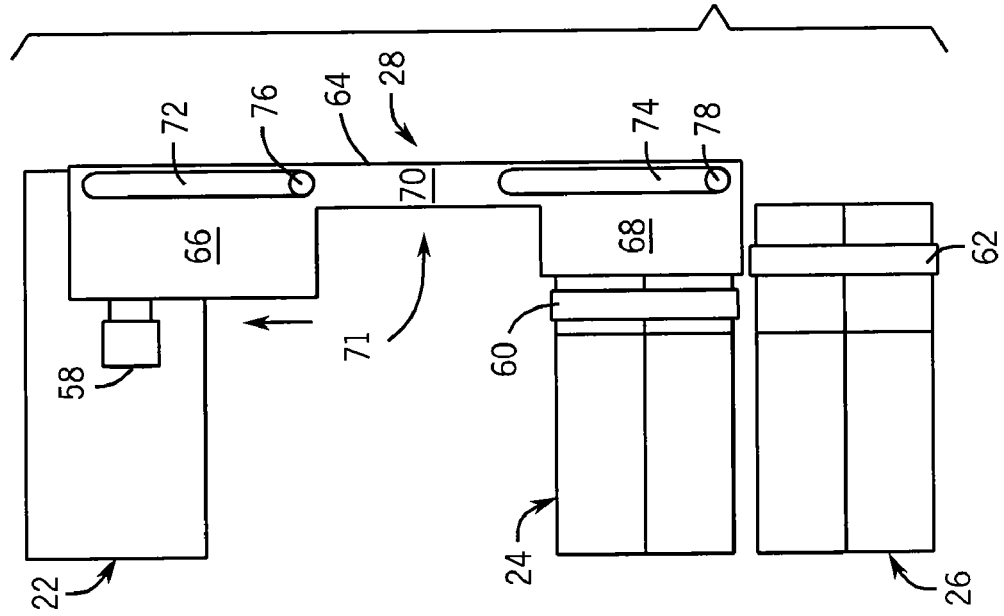
FIG. 3 is a schematic representation of a representative interlock arrangement positioned when power is being provided by a utility power source.
Figure 4:
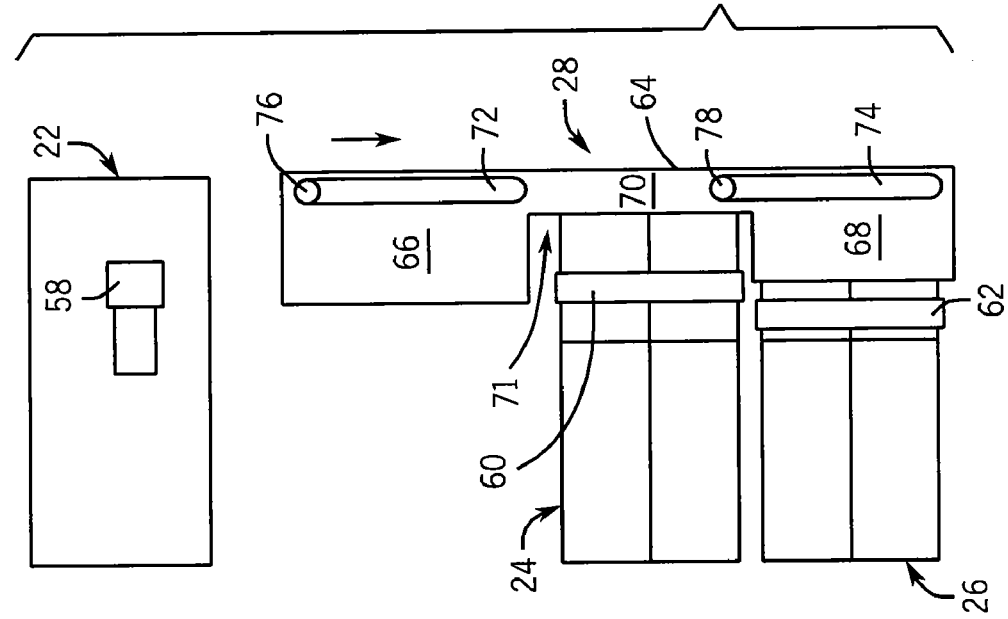
FIG. 4 is a schematic representation of the interlock arrangement of FIG. 3 positioned when power is being provided by an auxiliary power source.

The primary power input breaker 22 has a switch handle 58 that is movable between an ON or conductive position, as illustrated in FIG. 3, and an OFF or non-conductive position, as illustrated in FIG. 4. Similarly, auxiliary system breaker 24 and circuit breaker 26 each have a switch handle 60 and 62, respectively, that are each switchable between an ON or conductive position and an OFF or non-conductive position. In FIG. 3, the circuit breaker handle 62 is in the OFF position whereas feeder breaker switch handle 60 is in the ON position. In FIG. 4, the circuit breaker handle 62 is in the ON position whereas feeder breaker switch handle 60 is in the OFF position.

Interlock member 28 has a member body 64 defined by a pair of wide portions 66, 68 separated by a narrow portion 70 such that a recess 72 is effectively formed between the wide portions 66, 68. A groove 72, 74 is formed in each wide portion 66, 68, respectively, of the member body 64. Each groove 72, 74 is designed to receive a post 76, 78, respectively. This arrangement allows the interlock member 28 to be manually slid relative to the posts 76, 78 between two interlock positions. In the first interlock position, shown in FIG. 3, the interlock member 28 is slid away from the primary power input breaker 22 and thus does not interfere with the switching of the primary power input breaker handle 58 between its ON and OFF positions. Similarly, the narrow portion 70 of the interlock member 28 is aligned with the auxiliary system breaker 24 which allows the circuit breaker handle 60 to be switchable between its ON and OFF position. On the other hand, to achieve this first position, the feeder breaker handle 62 must be in its OFF position so that the wide portion 74 of the member body 64 can be slid downward relative to post 78. Thus, in the first interlock position, the wide portion 74 blocks the circuit breaker handle 62 from being switched from the OFF position to the ON position. In this regard, the primary power input breaker 22, the auxiliary system breaker 24, and the circuit breaker 26 cannot all be in the ON position simultaneously, but all the breakers may be switched to the OFF position simultaneously.

To switch the circuit breaker 26 to be in a conductive position, the primary power input breaker handle 58 and the feeder breaker handle 60 must each be slid to their respective OFF positions, as shown in FIG. 4. This movement frees the interlock member 28 to be slid upward along posts 76, 78, which frees circuit breaker handle 62 to be switched from the OFF position to the ON position. However, this movement of the interlock member 28 causes the wide portion 68 to be placed adjacent switch handle 60 of the auxiliary system breaker 24. As a result, the switch handle 60 cannot be switched from the OFF position to the ON position when the wide portion 68 is adjacent the switch handle 60. Thus, when the circuit breaker 62 is in a conductive position, neither the primary power input breaker 22 nor the auxiliary system breaker 24 may be switched to their ON or conductive positions. The primary power input breaker 22 and the auxiliary system breaker 24 may only be switched ON after the circuit breaker 26 is switched OFF, such as shown in FIG. 3.

This interlinked or interlocked breaker arrangement prevents the automatic transfer switch from sensing auxiliary power as restored primary power. Moreover, the present invention allows auxiliary power to be presented to circuits of a load center while preventing backfeeding of the primary power source without the need for a dedicated, and additional, primary power input breaker.

Figure 5:
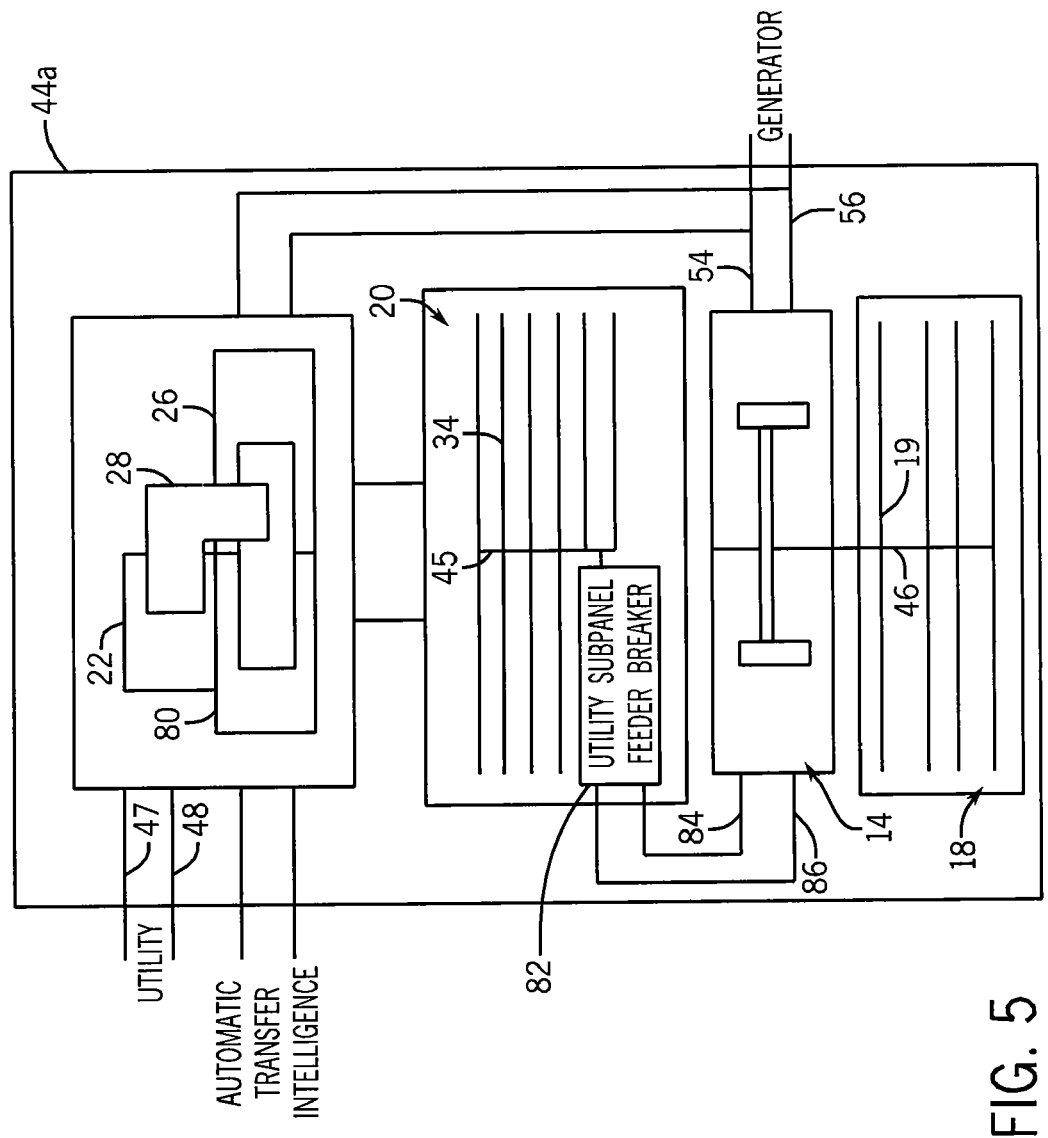
FIG. 5 is a schematic representation of a cabinet containing a manual transfer switch and an automatic transfer switch that is electrically isolated from the manual transfer switch when auxiliary power is used to energize loads of the manual transfer switch and wherein primary power signaling and primary power control are handled by separate switches according to an alternate embodiment of the invention.
Figure 6:
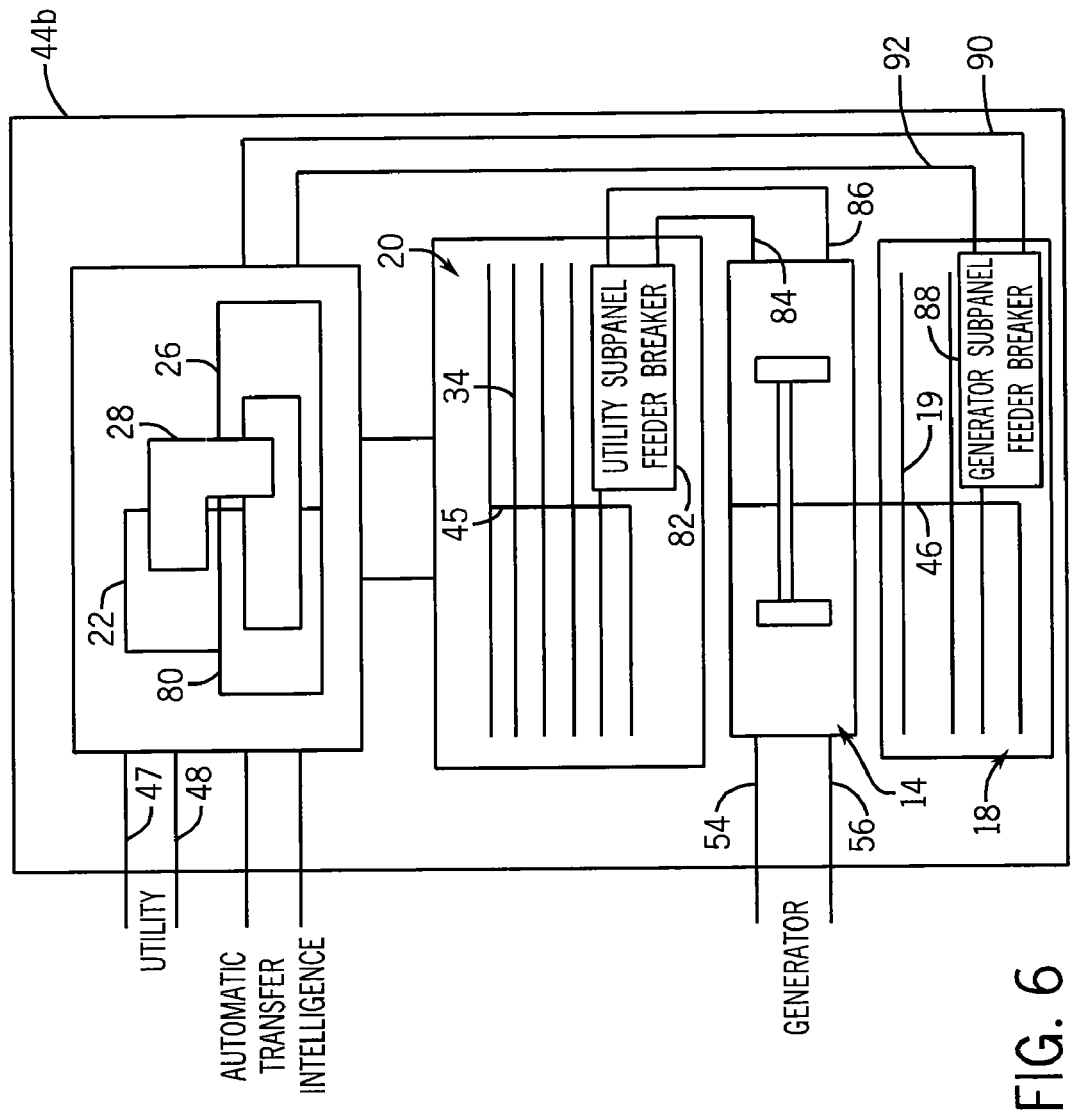
FIG. 6 is a schematic representation of a cabinet similar to that shown in FIG. 5 but in which an auxiliary power feed breaker is used to control the flow of electrical power to an input switch of a manual transfer switch according to another embodiment of the invention.
Figure 7:
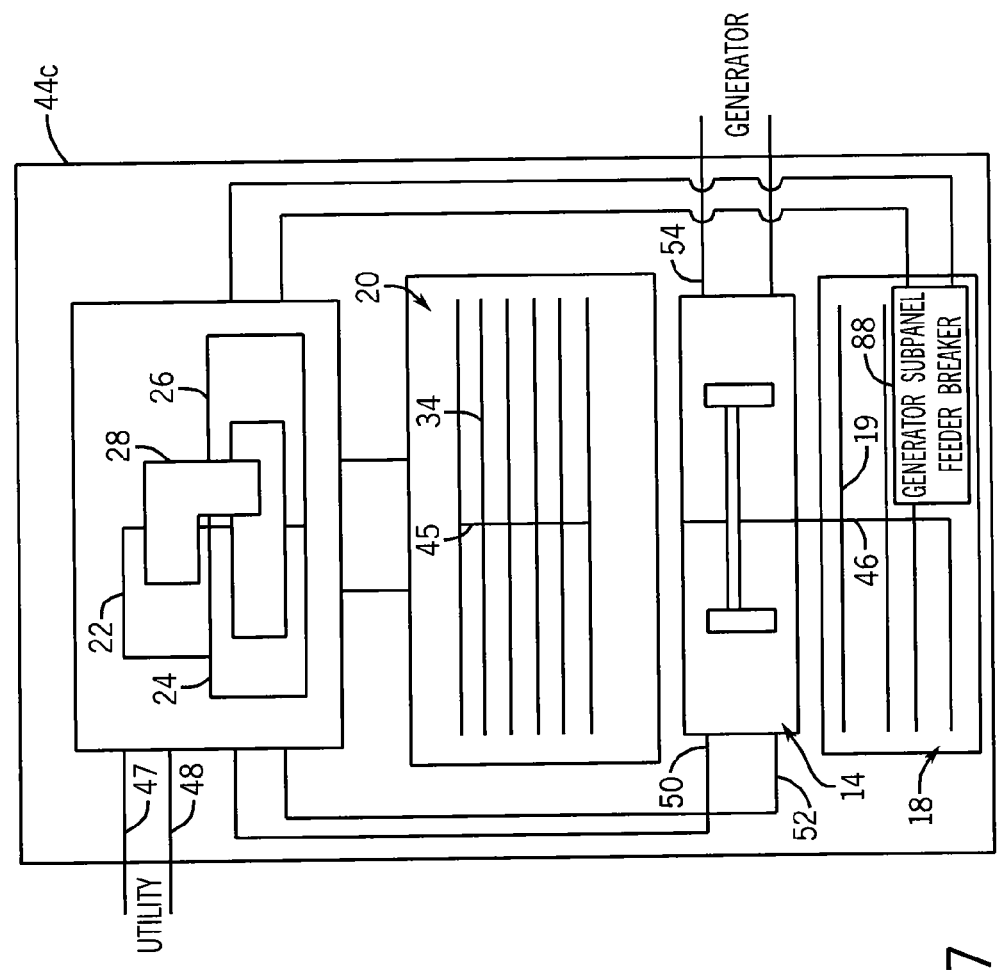
FIG. 7 is a schematic representation of a cabinet similar to the cabinet shown in FIG. 6 in which an auxiliary power feed breaker is used to control the flow of electrical power to an input switch of a manual transfer switch but in which primary current signaling and primary power control are handled by a shared switch according to an alternate embodiment of the present invention.

The cabinet 44 shown and described with respect to FIG. 2 is representative of one power distribution arrangement for which the present invention may be used. FIGS. 5-7 show differently configured cabinets for which the present invention may also be used. As will be described further below, the cabinets shown in FIGS. 5 and 6 have separate breakers or switches for signaling the operative status of the primary power source and controlling the flow of primary electrical power from a load center, and its bus, to a subpanel, and its bus. It will thus be appreciated that in the cabinet 44 shown in FIG. 2, the auxiliary system breaker 24 performs two functions: controls the presentment of primary power to the transfer switch 14 but also signals when there is an interruption of primary power. As described above, during normal operation and primary power is available, the bus 46 of the subpanel is fed primary power through the transfer switch 14. Circuitry (not shown) in the transfer switch 14 detects that primary power is available and controls the auxiliary power source, e.g., generator, accordingly. When there is an interruption of primary power, the control circuitry causes the transfer switch 14 to switch to isolate the subpanel from the utility power source and also cause activation of the auxiliary power source, which then feeds power to the bus 46 of the subpanel 18 through the transfer switch 14. In such an arrangement, the "intelligence" for signaling the auxiliary power source to begin feeding power to the transfer switch 14 is part of the transfer switch 14 itself. However, in some transfer switch designs, the aforementioned "intelligence" is part of the auxiliary power source. The constructions shown in FIG. 5 and FIG. 6 are applicable for those transfer switch arrangements in which the control circuitry is part of the auxiliary power source rather than the transfer switch.

Turning now to FIG. 5, cabinet 44a differs from cabinet 44 of FIG. 2 in the following respects. Auxiliary system breaker 24 has been replaced with a primary power feedback switch 80, which is a breaker or switch that includes components as known in the art to provide feedback to the automatic transfer intelligence regarding the status of the primary power source, e.g., utility. The automatic transfer intelligence may reside in either the transfer switch 14 or in the auxiliary power source. Cabinet 44a also differs from cabinet 44 of FIG. 2 by the inclusion of a subpanel feeder breaker or switch 82 that is connected to bus 45 of the load center 20. The subpanel feeder breaker 82 is wired to the transfer switch 14 via connecting leads 84 and 86. The subpanel feeder breaker 82 is representative of one means for feeding power to the transfer switch 14 from the load center bus 45. It is understood that other types of devices or connections could be used to connect the transfer switch 14 to the load center bus 45.

When primary power is available, the subpanel feeder breaker 82 must be switched to a conductive, e.g., ON, position for the power available on the load center bus 45 to be available to the subpanel bus 46 through the transfer switch 14. As such, absent a desire to electrically isolate the subpanel bus 46 from the load center bus 45, there is no reason to move the subpanel feeder switch 82 to its non-conductive, e.g., OFF, position. When the auxiliary power source is feeding power to the subpanel bus 46, the transfer switch 14 electrically isolates the subpanel bus 46 from the load center bus 45, so there is no need for the subpanel feeder switch 82 to be switched during the interruption of primary power.

The arrangement of cabinet 44a also allows the load center circuits 34 to be powered by auxiliary power during primary power interruption. More particularly, input breaker 26 must be switched to the ON position, but can only be switched to the ON position when the main breaker 22 is switched to the OFF position. This interlinked arrangement of the main breaker 22 and the input breaker 26 prevents the load center 20 from being supplied primary and auxiliary power simultaneously.

Input breaker 26 and the primary power feedback switch 80 are also interlinked such that movement of the input breaker 26 to the ON position moves the primary power feedback switch 80 to the OFF position. When the primary power feedback switch 80 is in the OFF position, the primary power feedback switch 80 cannot signal the automatic transfer intelligence that primary power has been restored. As such, when auxiliary power is being fed to the load center 20, the load center 20 will remain powered by the auxiliary power supply even when primary power is restored. Primary power will not be available to the load center 20 until the input breaker 26 is switched OFF, which causes the primary power feedback switch 80 to be switched ON, and the main breaker 22 is switched ON. With primary power restored, the primary power feedback switch 80 will provide power to the automatic transfer intelligence to enable the automatic transfer intelligence to sense that primary power has been restored, the auxiliary power source will be disabled, and the transfer switch 14 will be switched to allow the subpanel bus 46 to be fed power from the load center bus 45 through feed breaker 82 and the transfer switch 14. In a manner similar to that described with respect to FIG. 2, the interlock assembly 28 restricts movement of the main breaker 22, the input breaker 26, and the primary power feedback switch 80.

The cabinet 44b shown in FIG. 6 is similar to cabinet 44a shown in FIG. 5 but includes a generator subpanel feeder breaker 88 connected to the subpanel bus 46. Feeder breaker 88 allows auxiliary power to be fed from the auxiliary power source through the transfer switch 14, the subpanel bus 46, and to the input breaker 26 via connections 90, 92 thereby eliminating the need for the "y" connections between the transfer switch 14 and the auxiliary power source shown in FIG. 5. Operation of the switches and breakers of cabinet 44b is similar to those of cabinet 44a, except that the additional breaker 88, which is not present in cabinet 44a, must be in the ON position for auxiliary power to be fed to the input breaker 26. Similar to feeder breaker 82, whose functionality was described with respect to FIG. 5, feeder breaker 82 would normally be in the ON position and is thus being used to pull auxiliary power off the subpanel bus 46 and present that power to the input breaker 26. It is understood that other types of devices and/or connections could be used.

FIG. 7 shows a cabinet 44c similar in construction to cabinet 44 shown and described with respect to FIG. 2. More particularly, cabinet 44c includes feeder breaker 24 that provides both current signaling and power delivery for the transfer switch 14. Cabinet 44c however uses the generator subpanel feeder breaker 88 described above with respect to FIG. 6 to present auxiliary power to the input breaker 26. As mentioned above, feeder breaker 88 eliminates the need for the "y" connections shown in FIG. 2 and allows the auxiliary power to be pulled off the subpanel bus 46 rather than between the auxiliary power source and the transfer switch 14.

One skilled in the art will appreciate that the present invention realizes a number of advantages over automatic transfer switches of the prior art. One such advantage is that the present invention is compliant with the U.S. National Electrical Code which has been adopted by most U.S. states, thereby making the present invention a viable solution for consumers that desire to power non-critical loads with auxiliary power during primary power source outage without disconnecting critical loads, such as refrigeration and HVAC systems and medical equipment, from auxiliary power. In this regard, the present invention may be particularly advantageous for homeowners and other operators that use auxiliary power when there is a sustained or prolonged loss of primary power, e.g., in hurricane or flood stricken communities, yet desire to occasionally or temporarily power non-critical loads, such as televisions, stereo equipment, cellular phone chargers, and computers despite the loss of primary power.

While the invention has been shown and described in connection with controlling the supply of power using circuit breakers, it is understood that any satisfactory type of switching means may be employed to accomplish this function and that circuit breakers are but one representative embodiment of such a switching means.

The present invention has been described in terms of the preferred embodiment, and it is recognized that equivalents, alternatives, and modifications, aside from those expressly stated, are possible and within the scope of the appending claims.

We claim:

1. An assembly that coordinates powering of a second electrical panel having a bus and a first electrical panel having a bus when primary power to the first electrical panel and the second electrical panel is interrupted, the assembly comprising:

a primary power feedback switch located in the first electrical panel and electrically interconnected between a primary power source and control electronics that control delivery of auxiliary power to the bus of the second electrical panel, wherein the primary power feedback switch is switchable between a first state in which the primary power feedback switch is electrically connected to the primary power source and a second state in which the primary power feedback switch is electrically isolated from the primary power source;

an auxiliary power input switch electrically interconnected between an auxiliary power source and the first electrical panel, wherein the auxiliary power input switch is switchable between a third state in which current flow is permitted between the auxiliary power source and the bus of the first electrical panel and a fourth state in which current flow is prevented between the auxiliary power source and the bus of the first electrical panel; and an interlock interconnected between the primary power feedback switch and the auxiliary power input switch, wherein the interlock is adapted to prevent the primary power feedback switch from being in the first state when the auxiliary power input switch is in the third state.

2. The assembly of claim 1 further comprising a transfer switch interconnected between the bus of the first electrical panel and the bus of the second electrical panel, and wherein the transfer switch is further interconnected between the bus of the second electrical panel and the auxiliary power input switch.

3. The assembly of claim 1 further comprising a second electrical panel feeder switch located in the first panel and interconnected between the bus of the first electrical panel and the bus of the second electrical panel, wherein the second electrical panel feeder switch is switchable between a first state in which current flow is permitted between the bus of the first electrical panel and the bus of the second electrical panel and a second state in which current flow is prevented from the bus of the first electrical panel to the bus of the second electrical panel.

4. The assembly of claim 1 wherein the interlock is further adapted to prevent the auxiliary power input switch from being switched from the fourth state to the third state if the primary power feedback switch is in the first state.

5. The assembly of claim 1 wherein the interlock is further electrically interconnected with a primary power input switch that is switchable between a fifth state in which current flow is permitted between the primary power source and the bus of the first electrical panel and a sixth state in which current flow is prevented between the primary power source and the bus of the first electrical panel, and wherein the interlock is further adapted to prevent the primary power input switch from being switched from the sixth state to the fifth state if the auxiliary power input switch is in the third state.

6. The assembly of claim 1 wherein the interlock is further electrically connected with a primary power input switch that is switchable between a fifth state in which current flow is permitted between the primary power source and the bus of the first electrical panel and a sixth state in which current flow is prevented between the primary power source and the bus of the first electrical panel, and wherein the primary power input switch may be switched from the fifth state to the sixth state independent of the interlock.

7. The assembly of claim 1 further comprising a first electrical panel feeder breaker interconnected between the bus of the second electrical panel and the auxiliary power input switch, the first electrical panel feeder breaker operative to permit the presentment of electrical power, delivered to the bus of the second electrical panel from the auxiliary power source, to the auxiliary power input switch.

8. A power distribution apparatus for use with a primary power supply and an auxiliary power supply, comprising:
    a cabinet;
    a bus arrangement having a first set of circuit breakers, the bus arrangement contained within the cabinet;
    a transfer electrical bus arrangement having a second set of circuit breakers, the transfer electric bus arrangement contained within the cabinet;
    a manual transfer switch assembly associated with the bus arrangement and an automatic transfer switch assembly associated with the transfer electrical bus arrangement, wherein the manual transfer switch assembly includes a primary power input switch that is fed primary power, a primary power feedback switch interconnected between the primary power switch and the bus arrangement, and an auxiliary power input switch that may be fed auxiliary power interconnected between the auxiliary power supply and the bus arrangement; and
    an interlock assembly associated with the manual transfer switch assembly that electrically isolates the automatic transfer switch assembly from the manual transfer switch assembly when auxiliary power is energizing the first set of circuit breakers.

9. The apparatus of claim 8 wherein the bus arrangement includes a transfer electrical bus arrangement feeder breaker electrically connected to the automatic transfer switch assembly and operative to deliver primary power from the primary power supply to the transfer electrical bus arrangement.

10. The apparatus of claim 8 wherein the interlock assembly mechanically prevents the power input switch and the primary power feedback switch from being in a conductive position when the auxiliary power input switch is in a conductive position.

11. The apparatus of claim 10 wherein the automatic transfer switch is adapted to automatically energize the second set of circuit breakers with power from the auxiliary power supply during the interruption of primary power.

12. An electrical panel assembly for use with a primary power supply and a secondary power supply that is used to supply power during interruption of the primary power supply, the panel comprising:
    a first set of circuit breakers connected to a first bus and a second set of circuit breakers connected to a second bus, wherein one of the first set of circuit breakers includes a feeder breaker adapted to electrically connect the second set of circuit breakers to the first bus;
    a power input switch adapted to electrically connect the first bus to the primary power supply when in a first position and electrically isolate the first bus from the primary power supply when in a second position;
    a primary power feedback switch adapted to signal the presence of an operative primary power supply when in a first position and to signal whether the primary power supply is operative when in a second position, the primary power feedback switch having an output connected to control circuitry operative to automatically activate the secondary power supply upon interruption of primary power;
    a manual transfer switch associated with the power input switch and the primary power feedback switch and an automatic transfer switch;
    wherein the manual transfer switch connects the first set and the second set of circuit breakers to the primary power supply when in a first position and may connect only the first set of circuit breakers to the secondary power supply when in a second position, and
    wherein the automatic transfer switch connects the second set of circuit breakers to the primary power supply, through the manual transfer switch, the first bus, and the feeder breaker, when in a third position and automatically connects the second set of circuit breakers to the secondary power supply during interruption of the primary power supply and automatically disconnects the second set of circuit breakers from the first bus during interruption of the primary power supply, wherein the signal for the interruption of the primary power supply is sent by the primary power feedback switch.

13. The electrical panel assembly of claim 12 further comprising a cabinet and wherein the first set of circuit breakers and the second set of circuit breakers, the power input switch, the primary power feedback switch, the manual transfer switch and the automatic transfer switch are contained with the cabinet.

14. The electrical panel assembly of claim 12 wherein the manual transfer switch includes an auxiliary power input switch that is adapted to feed secondary electrical power from the secondary power supply to the first set of circuit breakers when in a conductive position.

15. The electrical panel assembly of claim 14 further comprising an interlock member interlinked with the power input switch and the auxiliary power input switch, and adapted to prevent the primary power input switch and the auxiliary power input switch from both being in their conductive positions simultaneously.

16. The electrical panel assembly of claim 15 wherein the interlock member is interlinked with the primary power feedback switch and adapted to prevent the primary power feedback switch from being in a signaling position when the auxiliary power input switch is in its conductive position.

17. The electrical panel assembly of claim 16 wherein the automatic transfer switch includes the control circuitry and an auxiliary power input and a primary power input, and wherein the control circuitry is operative to receive the output of the primary power feedback switch and responsive to a signal indicating interruption of primary power and automatically causes the secondary power supply to energize the auxiliary power input.

18. The electrical panel assembly of claim 16 wherein the secondary power supply includes the control circuitry, and is operative to cause switching of the automatic transfer switch upon reception of a signal from the primary power feedback switch indicative of an interruption of primary power.

19. The electrical panel assembly of claim 14 wherein the second set of breakers includes a feeder breaker adapted to feed electrical power supplied by the secondary power supply to the auxiliary power input switch of the manual transfer switch.

20. The electrical panel assembly of claim 12 wherein the automatic transfer switch is electrically isolated from the primary power supply when the first set of circuit breakers are energized by the secondary power supply.

21. In an electrical power distribution system that includes a primary power supply, a secondary power supply, one or more first electrical circuits, one or more second electrical circuits, and an automatic transfer switch that supplies electrical power from the secondary power supply to the second electrical circuits upon interruption in the supply of power from the primary power supply, a method of supplying power from the secondary power supply to the one or more first electrical circuits when the supply of power from the primary power supply is interrupted, comprising the acts of:

sensing interruption of primary power;

connecting the second electrical circuits to the secondary power supply through the automatic transfer switch when power from the primary power supply is sensed as interrupted;

selectively connecting the first electrical circuits to the secondary power supply during interruption of the primary power supply; and wherein selectively connecting the first electrical circuits to the secondary power supply automatically prevents connection of the primary power supply to the first electrical circuits and prevents the sensing of a return of primary power.

\* \* \* \* \*